(12) United States Patent
Park

(10) Patent No.: US 9,927,931 B2
(45) Date of Patent: Mar. 27, 2018

(54) TOUCH PANEL AND METHOD OF MANUFACTURING THE SAME

(71) Applicant: Samsung Display Co., Ltd., Yongin, Gyeonggi-Do (KR)

(72) Inventor: Hong Sick Park, Suwon-si (KR)

(73) Assignee: Samsung Display Co., Ltd. (KR)

( * ) Notice: Subject to any disclaimer, the term of this patent is extended or adjusted under 35 U.S.C. 154(b) by 329 days.

(21) Appl. No.: 14/668,266

(22) Filed: Mar. 25, 2015

(65) Prior Publication Data
US 2016/0170512 A1    Jun. 16, 2016

(30) Foreign Application Priority Data

Dec. 16, 2014  (KR) .................... 10-2014-0180958

(51) Int. Cl.
G06F 3/044  (2006.01)

(52) U.S. Cl.
CPC .... *G06F 3/044* (2013.01); *G06F 2203/04103* (2013.01); *G06F 2203/04111* (2013.01)

(58) Field of Classification Search
CPC . G06F 2203/04106; G06F 2203/04111; G06F 2203/04103; G06F 2203/04107; G06F 3/041–3/047
USPC ..................... 178/18.01–19.07; 345/173–178
See application file for complete search history.

(56) References Cited

U.S. PATENT DOCUMENTS

| | | |
|---|---|---|
| 2010/0328247 A1 | 12/2010 | Miki et al. |
| 2011/0017524 A1 | 1/2011 | Chen et al. |
| 2011/0169783 A1* | 7/2011 | Wang .................... G06F 3/0412 345/176 |
| 2014/0253495 A1 | 9/2014 | Kang et al. |
| 2015/0162908 A1* | 6/2015 | Hsu ........................ G06F 3/044 200/5 R |

FOREIGN PATENT DOCUMENTS

| | | |
|---|---|---|
| EP | 2 354 899 A2 | 8/2011 |
| JP | 2013-164698 A | 8/2013 |
| KR | 20100119794 A | 11/2010 |

(Continued)

OTHER PUBLICATIONS

European Search Report, EP Application No. 15177764.6, dated Sep. 21, 2015, 8 pages.

*Primary Examiner* — Michael Pervan
(74) *Attorney, Agent, or Firm* — Innovation Counsel LLP

(57) ABSTRACT

A touch panel includes: a substrate which has sensing and peripheral areas; first sensing electrodes located on a surface of the substrate and arranged along a first direction in the sensing area and second sensing electrodes arranged along a second direction intersecting the first direction; a first connector located on the surface of the substrate and connecting the first sensing electrodes along the first direction; an insulating layer pattern located on the first connector; a second connector located on the insulating layer pattern, intersecting the first connector to be insulated from the first connector, and connecting the second sensing electrodes along the second direction; wiring lines located on the surface of the substrate, located in the peripheral area, and electrically connected to the first sensing electrodes or the second sensing electrodes; and a conductive pattern located between each of the second sensing electrodes and the second connector.

14 Claims, 10 Drawing Sheets

(56) References Cited

FOREIGN PATENT DOCUMENTS

| KR | 1020110131957 A | 12/2011 |
|----|-----------------|---------|
| KR | 1020120131542 A | 12/2012 |
| KR | 1020120137216 A | 12/2012 |
| KR | 1020130063472 A | 6/2013  |
| KR | 1020140055351 A | 5/2014  |
| WO | 2014098013 A1  | 6/2014  |

* cited by examiner

TOUCH PANEL AND METHOD OF MANUFACTURING THE SAME

CROSS-REFERENCE TO RELATED APPLICATION

This application claims priority from Korean Patent Application No. 10-2014-0180958 filed on Dec. 16, 2014 in the Korean Intellectual Property Office, the disclosure of which is incorporated herein by reference in its entirety.

BACKGROUND

1. Field

The present application relates to a touch panel and a method of manufacturing the same.

2. Description of the Related Art

Touch panels are being applied to liquid crystal displays (LCDs) or organic light-emitting displays as input devices. A touch panel is a device touched by a user's finger or an object such as a pen to input a command. The touch panel recognizes a touch position by sensing a change in capacitance or voltage between two electrodes and provides a user's command corresponding to the touch position to a display device.

Generally, a touch panel includes two sensing electrodes for sensing a position touched by a finger or an object and wiring lines respectively connected to the two sensing electrodes. Therefore, to manufacture a touch panel, a mask for forming sensing electrodes and a mask for forming wiring lines are needed, and a photolithography process is performed using the masks.

The photolithography process includes forming a photosensitive layer, exposing the photosensitive layer to light by using a mask, and developing the exposed photosensitive layer.

Since one photolithography process includes a number of steps, the addition of the photolithography process to the process of manufacturing a touch panel can complicate the entire manufacturing process, and contamination or defects can occur in the process of removing the photosensitive layer.

SUMMARY

Aspects of the inventive concept provide a touch panel which can be manufactured in a simplified process and a method of manufacturing the touch panel.

However, aspects of the inventive concept are not restricted to the ones set forth herein. The above and other aspects of the inventive concept will become more apparent to one of ordinary skill in the art to which the present application pertains by referencing the detailed description of the inventive concept given below.

According to an aspect of the inventive concept, there is provided a touch panel. The touch panel includes: a substrate which includes a sensing area and a peripheral area; a plurality of first sensing electrodes which are located on a surface of the substrate and arranged along a first direction in the sensing area and a plurality of second sensing electrodes which are arranged along a second direction intersecting the first direction; a first connector which is located on the surface of the substrate and connects the first sensing electrodes along the first direction; an insulating layer pattern which is located on the first connector; a second connector which is located on the insulating layer pattern, intersects the first connector to be insulated from the first connector, and connects the second sensing electrodes along the second direction; a plurality of wiring lines which are located on the surface of the substrate, located in the peripheral area, and electrically connected to the first sensing electrodes or the second sensing electrodes; and a conductive pattern which is located between each of the second sensing electrodes and the second connector.

According to another aspect of the inventive concept, there is provided a method of manufacturing a touch panel. The method includes forming a first conductive layer on a surface of a substrate. A second conductive layer is formed on the first conductive layer. A plurality of first sensing electrodes which are arranged along a first direction are formed. A plurality of second sensing electrodes which are arranged along a second direction intersecting the first direction are formed. The first conductive layer and the second conductive layer are patterned to form a conductive pattern which is located on each of the first and second sensing electrodes, a first connector, and a plurality of wiring patterns which connect the first sensing electrodes along the first direction. An insulating layer pattern which covers the first connector is formed. A third conductive layer, which covers the first sensing electrodes, the second sensing electrodes, the conductive pattern, the insulating layer pattern, and the wiring patterns, is formed on the surface of the substrate. A fourth conductive layer is formed on the third conductive layer. A second connector and a plurality of wiring lines which intersect the first connector and connect the second sensing electrodes along the second direction are formed by patterning the third conductive layer, the fourth conductive layer, and the conductive pattern.

Other features and exemplary embodiments will be apparent from the following detailed description, the drawings, and the claims.

BRIEF DESCRIPTION OF THE DRAWINGS

The above and other aspects and features of the inventive concept will become more apparent by describing in detail exemplary embodiments thereof with reference to the attached drawings, in which.

DETAILED DESCRIPTION

Figure 1:
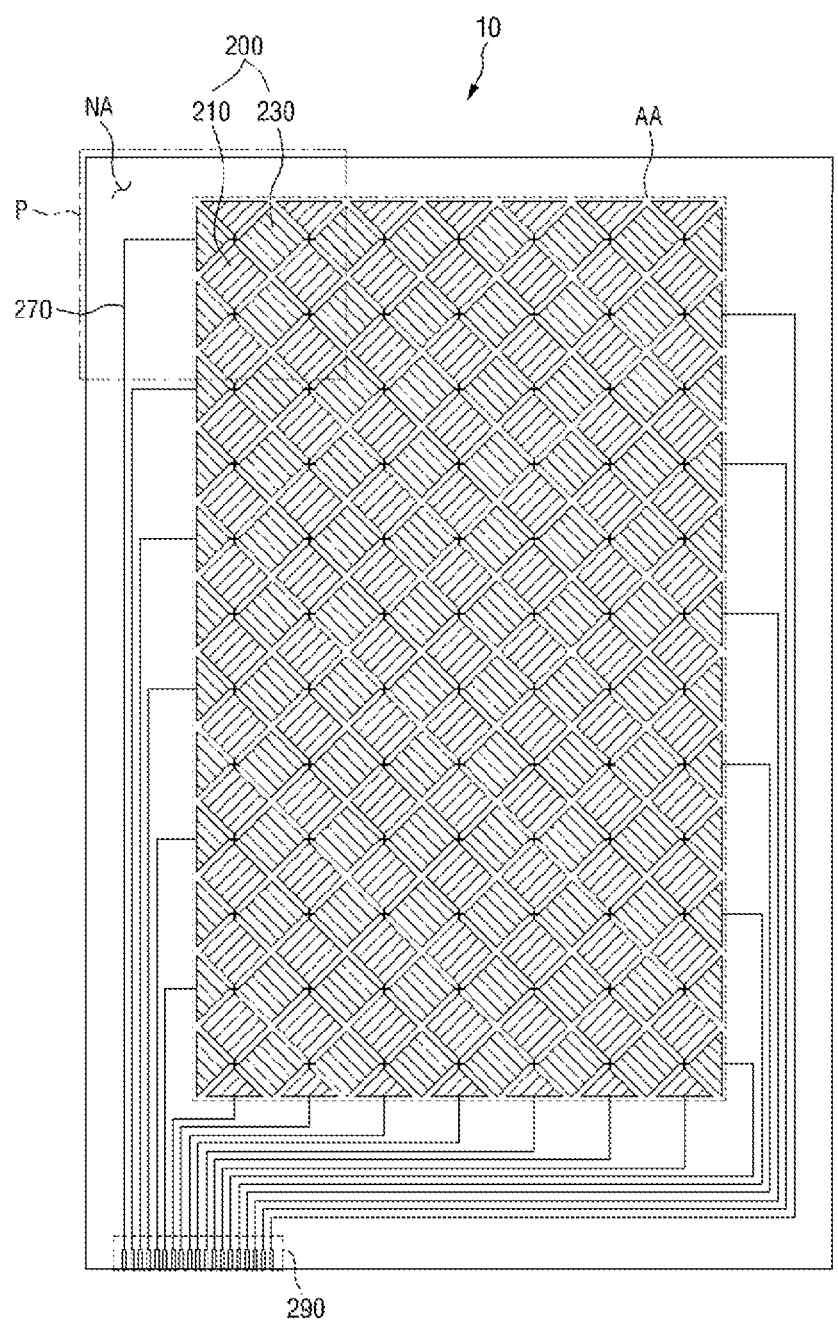
FIG. 1 is a schematic plan view of a touch panel according to an exemplary embodiment.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, a region illustrated as a rectangle will, sometimes, have rounded or curved features and/or a gradient of concentration at its edges rather than a binary change between regions. Thus, the regions illustrated in the figures are schematic in nature and their shapes may not be intended to illustrate the actual shape of a region of a device and are not intended to limit the scope of the inventive concept.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Unless otherwise defined, all terms (including technical and scientific terms) used herein have the same meaning as commonly understood by one of ordinary skill in the art to which the present application belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, embodiments will be described with reference to the attached drawings.

Figure 2:
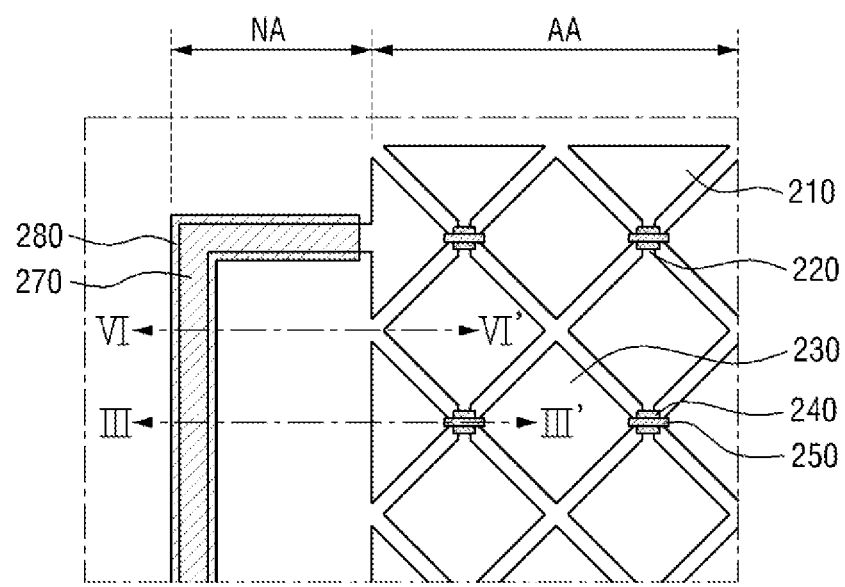
FIG. 2 is an enlarged plan view of a portion P of FIG. 1.
Figure 3:
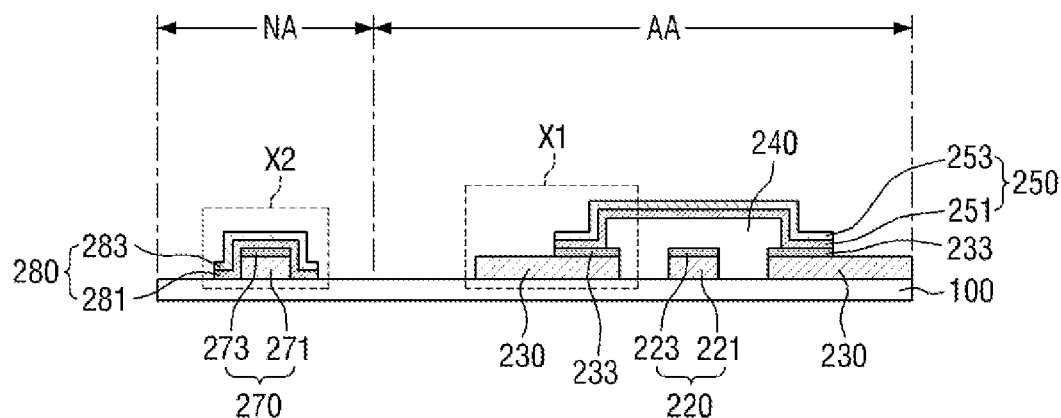
FIG. 3 is a cross-sectional view of the touch panel taken along the line III-III' of FIG. 2.
Figure 4:
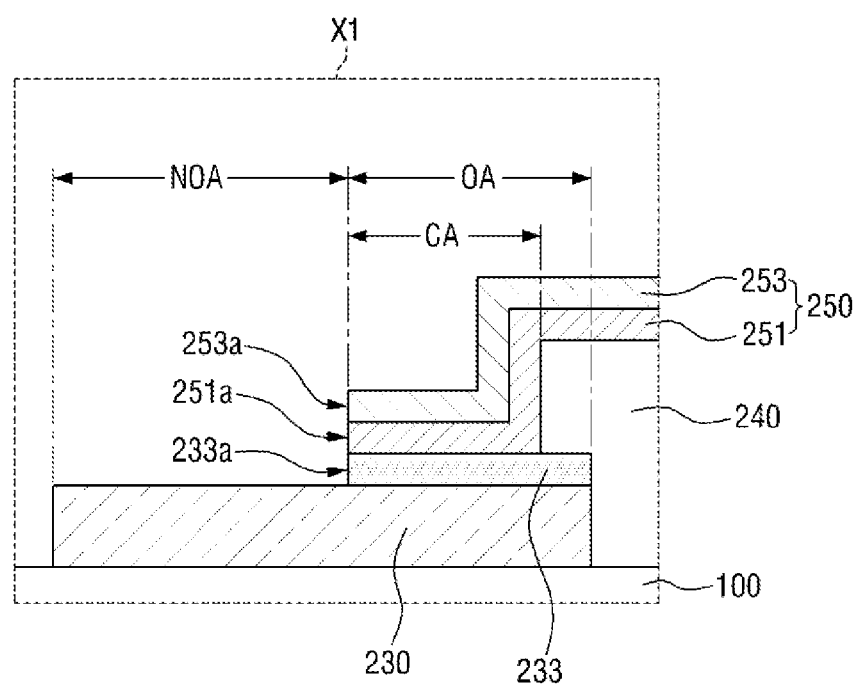
FIGS. 4 and 5 are enlarged views of portions X1, X2 of FIG. 3, respectively.
Figure 5:
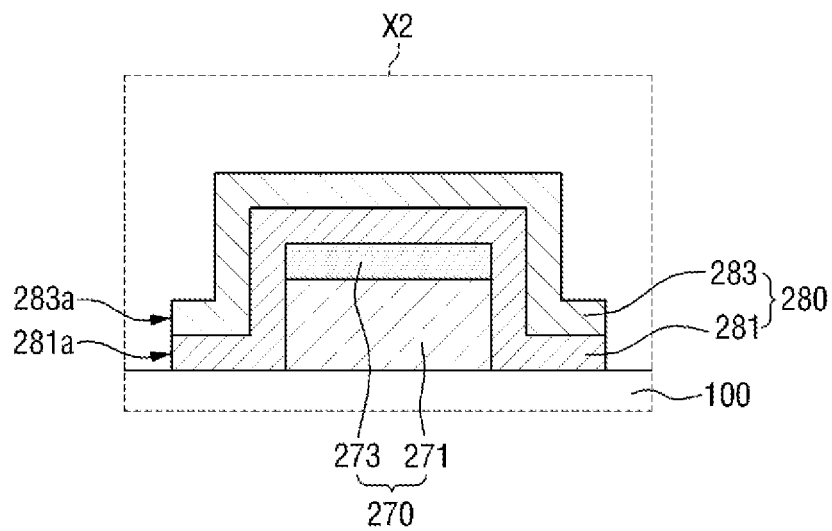
Figure 6:
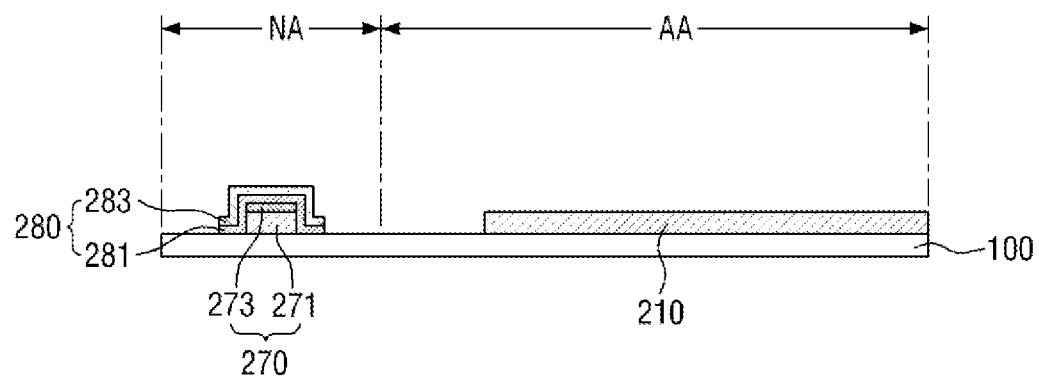
FIG. 6 is a cross-sectional view of the touch panel taken along the line VI-VI' of FIG. 2.

FIG. 1 is a schematic plan view of a touch panel 10 according to an embodiment. FIG. 2 is an enlarged plan view of a portion of FIG. 1, more specifically, a portion P of FIG. 1. FIG. 3 is a cross-sectional view of the touch panel 10 taken along the line III-III' of FIG. 2. FIGS. 4 and 5 are enlarged plan views of a portion of FIG. 3. More specifically, FIG. 4 is an enlarged view of a portion X1 of FIG. 3, and FIG. 5 is an enlarged view of a portion X2 of FIG. 3. FIG. 6 is a cross-sectional view of the touch panel 10 taken along the line VI-VI' of FIG. 2.

Referring to FIGS. 1 through 6, the touch panel 10 according to the current embodiment may include a substrate 100, a plurality of sensing electrodes 200, a first connector 220, a conductive pattern 233, an insulating layer pattern 240, a second connector 250, and a plurality of wiring lines (270, 280).

The sensing electrodes 200, the first connector 220, the conductive pattern 233, the insulating layer pattern 240, the second connector 250, and the wiring lines (270, 280) are disposed on a surface of the substrate 100. The substrate 100 may be made of a transparent material. In some embodiments, the transparent material may be, but is not limited to, tempered glass, acrylic resin, polyethylene terephthalate (PET), polycarbonate (PC), polyimide (PI), polyethersulfone (PES), polymethyl methacrylate (PMMA), polyethylene naphthalate (PEN), metal foil, fiber reinforced plastic (FRP), or silicon rubber. The substrate 100 may have rigidity. However, the inventive concept is not limited thereto, and the substrate 100 may also have ductility. In other words, the substrate 100 may be a flexible substrate.

The substrate 100 may include a sensing area AA and a peripheral area NA defined outside the sensing area AA. The sensing area AA is an area for sensing a touch position of a hand or an object. The sensing electrodes 200, the first connector 220, the conductive pattern 233, the insulating layer pattern 240, and the second connector 250 may be located on the surface of the substrate 100 in the sensing area AA.

The peripheral area NA is located outside the sensing area AA. The wiring lines (270, 280) connected to the sensing electrodes 200 and a pad unit 290 connected to the wiring lines (270, 280) may be located on the surface of the substrate 100 in the peripheral area NA.

A driver circuit board (not illustrated) for driving the touch panel 10 may be electrically connected to the pad unit 290.

The sensing electrodes 200 may be located on the surface of the substrate 100 in the sensing area AA. The sensing electrodes 200 may include a plurality of first sensing electrodes 210 arranged in a first direction (a vertical direction in the drawings) and a plurality of second sensing electrodes 230 arranged in a second direction (a horizontal direction in the drawings) intersecting the first direction.

The first sensing electrodes 210 and the second sensing electrodes 230 may be separated from each other. For example, the first sensing electrodes 210 and the second sensing electrodes 230 may be physically separated from each other and may not directly contact each other. Further, the first sensing electrodes 210 and the second sensing electrodes 230 may be electrically insulated from each other.

The first sensing electrodes 210 and the second sensing electrodes 230 may be located at the same level. When the first and second sensing electrodes 210 and 230 are located at the same level, it means that they are located on the same layer. In some embodiments, the first sensing electrodes 210 and the second sensing electrodes 230 may be formed on the surface of the substrate 100 to directly contact the substrate 100.

The first sensing electrodes 210 and the second sensing electrodes 230 may be made of an optically transparent light-transmitting conductive material. Here, the optically transparent conductive material denotes not only a conductive material that is transparent but also a conductive material that is opaque but is perceived as transparent when seen with the naked eye because basic constituent units of the conductive material are very small and arranged at an appropriate density. In some embodiments, the light-transmitting conductive material may be a metal material. In an example, the light-transmitting conductive material may be metal nanowires, and the metal nanowires may be nanowires that contain silver (Ag). However, the inventive concept is not limited thereto, and the metal nanowires may also contain gold (Au), platinum (Pt), nickel (Ni), or silicon.

In some embodiments, the first sensing electrodes 210 and the second sensing electrodes 230 may be formed of the same material in the same process.

The first sensing electrodes 210 neighboring each other along the first direction (or the vertical direction in the drawings) may be connected by the first connector 220 located on the surface of the substrate 100.

The first connector 220 may be located on the surface of the substrate 100 in the sensing area AA. The first connector 220 may include a lower conductive pattern 221 located on the surface of the substrate 100 and an upper conductive pattern 223 located on the lower conductive pattern 221.

In some embodiments, the lower conductive pattern 221 may be located at the same level as the first sensing electrodes 210 and the second sensing electrodes 230. The lower conductive pattern 221 may be formed on the surface of the substrate 100 to directly contact the substrate 100.

Like the first sensing electrodes 210 and the second sensing electrodes 230, the lower conductive pattern 221 may be made of a light-transmitting conductive material. The light-transmitting conductive material may be a metal material. In an example, the light-transmitting conductive material may be metal nanowires. The metal nanowires are the same as those described above in the description of the first sensing electrodes 210 and the second sensing electrodes 230, and thus a detailed description thereof is omitted.

In some embodiments, the lower conductive pattern 221 may be made of the same material as the first sensing electrodes 210 and the second sensing electrodes 230 and may be formed in the same process as the first sensing electrodes 210 and the second sensing electrodes 230. In addition, the lower conductive pattern 221 may be formed integrally with each of the first sensing electrodes 210.

The upper conductive pattern 223 may be made of a transparent conductive material. In some embodiments, the transparent conductive material may be a zinc oxide-based material. In an example, the zinc oxide-based material may include, but not limited to, at least one of indium zinc oxide (IZO), Al-doped zinc oxide (AZO), and gallium zinc oxide (GZO). The upper conductive pattern 223 may be made of the same material as the conductive patterns 233 and a first wiring pattern 271 which will be described later.

The lower conductive pattern 221 and the upper conductive pattern 223 may have substantially the same planar shape. More specifically, when seen in plan view, the lower conductive pattern 221 and the upper conductive pattern 223 may have the same planar shape and completely overlap each other.

The insulating layer pattern 240 may be located on the first connector 220 to cover the first connector 220. The insulating layer pattern 240 may completely cover the first connector 220. In some embodiments, at least part of the insulating layer pattern 240 may extend onto each of the second sensing electrodes 230. In other words, at least part of the insulating layer pattern 240 may partially cover an upper portion of each of the second sensing electrodes 230.

The insulating layer pattern 240 may be made of an insulating material. In some embodiments, the insulating material may be an organic insulating material. In an exemplary embodiment, the organic insulating material may be positive photosensitive resin. The positive photosensitive resin may include, but is not limited to, binder resin exemplified by alkali-soluble resin, a photosensitizer having various structures, and a solvent.

The second connector 250 may be located on the insulating layer pattern 240 and intersect the first connector 220 to be insulated from the first connector 220. The second connector 250 may electrically connect the second sensing electrodes 230 neighboring each other along the second direction (or the horizontal direction in FIG. 2).

The second connector 250 may be made of a conductive material and may have a multilayer structure. In an example, the second connector 250 may include a first conductive pattern 251 located on each of the second sensing electrodes 230 and the insulating layer pattern 240 and a second conductive pattern 253 located on the first conductive pattern 251.

The first conductive pattern 251 may be located on the insulating layer pattern 240 and directly contact the insulating layer pattern 240. The first conductive pattern 251 may extend onto each of the second sensing electrodes 230 to electrically connect the second sensing electrodes 230 neighboring each other along the second direction.

In some embodiments, the first conductive pattern 251 may contain a conductive material with low resistivity. The conductive material with low resistivity may have a lower resistance value than the first sensing electrodes 210 and the second sensing electrodes 230. In an example, the conductive material with low resistivity may be molybdenum (Mo), silver (Ag), titanium (Ti), copper (Cu), aluminum (Al), or Mo/Al/Mo. In a more specific embodiment, the conductive material with low resistivity may be, but is not limited to, copper (Cu). In some embodiments, the first conductive pattern 251 may be made of the same material as a third wiring pattern 281 which will be described later.

The second conductive pattern 253 may be located on the first conductive pattern 251 and may function as a capping layer that protects the first conductive pattern 251. In some embodiments, the second conductive pattern 253 may be made of a transparent conductive material. In an exemplary embodiment, the transparent conductive material may be a zinc oxide-based material. The zinc oxide-based material may include, but not limited to, at least one of IZO, AZO, and GZO. The second conductive pattern 253 may be made of the same material as a fourth wiring pattern 283 which will be described later. In some embodiments, the second conductive pattern 253 may be made of the same material as the conductive pattern 233 which will be described later.

The first conductive pattern 251 and the second conductive pattern 253 may have substantially the same planar shape. More specifically, when seen in plan view, the first conductive pattern 251 and the second conductive pattern 253 may have the same planar shape and completely overlap each other.

The conductive pattern 233 may be located on each of the second sensing electrodes 230. The conductive pattern 233 may be located between each of the second sensing electrodes 230 and the second connector 250. In addition, when part of the insulating layer pattern 240 is located on each of the second sensing electrodes 230, part of the conductive pattern 233 may be located between each of the second sensing electrodes 230 and the insulating layer pattern 240.

In some embodiments, the conductive pattern 233 may be located only in an area OA, sometimes called an overlap area OA, in which each of the second sensing electrodes 230 overlaps the second connector 250. In other words, the conductive pattern 233 may not be located on an area NOA, sometimes called a non-overlap area NOA, of each of the second sensing electrodes 230 which is not overlapped by the second connector 250 and may not be located on each of the first sensing electrodes 210 on which the second connector 250 is not located. When part of the insulating layer pattern 240 is located on each of the second sensing electrodes 230, the conductive pattern 233 may directly contact the second connector 250 in a contact area CA in which the second connector 250 is electrically connected to each of the second sensing electrodes 230.

An outer side surface 233a of the conductive pattern 233 may substantially be continuous with an outer side surface 251a and 253a of the second connector 250. When outer side surfaces of two elements are continuous with each other, there may be substantially no step difference between the two elements when seen in cross-sectional view. For example, there may be substantially no step difference between the outer side surface 233a of the conductive pattern 233 and the outer side surface 251a and 253a of the second connector 250. In other words, the outer side surface 233a of the conductive pattern 233 and the outer surface 251a and 253a of the second connector 250 may lie on the same virtual straight line when seen in cross-sectional view.

The conductive pattern 233 may be made of a transparent conductive material. In an exemplary embodiment, the transparent conductive material may be a zinc oxide-based material. The zinc oxide-based material may include, but not limited to, at least one of IZO, AZO, and GZO. As described above, the conductive pattern 233 may be made of the same material as the upper conductive pattern 223. In addition, the conductive pattern 233 may be made of the same material as a second wiring pattern 273. In some embodiments, the conductive pattern 233 may also be made of the same material as the second conductive pattern 253 described above and the fourth wiring pattern 283 to be described later.

The wiring lines (270, 280) may be located on the surface of the substrate 100 in the peripheral area NA. The wiring lines (270, 280) may be electrically connected to the first sensing electrodes 210 and the second sensing electrodes 230. In some embodiments, each of the wiring lines (270, 280) may be directly connected to at least any one of the sensing electrodes 200 which is located at an outermost edge of the sensing area AA.

Each of the wiring lines (270, 280) may include an inner wiring pattern 270 which is located on the substrate 100 and an outer wiring pattern 280 which covers the inner wiring pattern 270.

The inner wiring pattern 270 may include the first wiring pattern 271 located on the substrate 100 and the second wiring pattern 273 located on the first wiring pattern 271.

The first wiring pattern 271 may be may be made of an optically transparent light-transmitting conductive material. In some embodiments, the light-transmitting conductive material may be a metal material. In an example, the light-transmitting conductive material may be metal nanowires, and the metal nanowires may be nanowires that contain Ag. However, the inventive concept is not limited thereto, and the metal nanowires may also contain Au, Pt, Ni, or silicon. In some embodiments, the first wiring pattern 271 may be made of the same material as the first sensing electrodes 210 and the second sensing electrodes 230. In addition, the first wiring pattern 271 may be located at the same level as the first sensing electrodes 210 and the second sensing electrodes 230.

The second wiring pattern 273 may be located on the first wiring pattern 271. In some embodiments, the second wiring pattern 273 may be made of a transparent conductive material. In an exemplary embodiment, the transparent conductive material may be a zinc oxide-based material. The zinc oxide-based material may include, but not limited to, at least one of IZO, AZO, and GZO. The second wiring pattern 273 may be made of the same material as the conductive pattern 233 and the upper conductive pattern 223 described above.

The first wiring pattern 271 and the second wiring pattern 273 may have substantially the same planar shape. More specifically, when seen in plan view, the first wiring pattern 271 and the second wiring pattern 273 may have the same planar shape and completely overlap each other.

The outer wiring pattern 280 may be located on the inner wiring pattern 270 and extend onto the surface of the substrate 100 over the inner wiring pattern 270.

The outer wiring pattern 280 may include the third wiring pattern 281 and the fourth wiring pattern 283 located on the third wiring pattern 281.

The third wiring pattern 281 may contain a conductive material with low resistivity. The conductive material with low resistivity may be Mo, Ag, Ti, Cu, Al, or Mo/Al/Mo. In an exemplary embodiment, the conductive material with low resistivity may be Cu. In some embodiments, the third wiring pattern 281 may be made of the same material as the first wiring pattern 251 described above.

The fourth wiring pattern 283 may be located on the third wiring pattern 281. In some embodiments, the fourth wiring pattern 283 may be made of a transparent conductive material. In an exemplary embodiment, the transparent conductive material may be a zinc oxide-based material. The zinc oxide-based material may include, but not limited to, at least one of IZO, AZO, and GZO. The fourth wiring pattern 283 may be made of the same material as the second conductive pattern 253 described above. In some embodiments, the fourth wiring pattern 283 may also be made of the same material as the conductive pattern 233 and the upper conductive pattern 223.

A side surface 281a of the third wiring pattern 281 may be substantially continuous with a side surface 283a of the fourth wiring pattern 283. In other words, there may be substantially no step difference between the side surface 281a of the third wiring pattern 281 and the side surface 283a of the fourth wiring pattern 283.

A method of manufacturing the above-described touch panel 10 will now be described.

FIGS. 7 through 17 are cross-sectional views illustrating a method of manufacturing a touch panel according to an embodiment, more specifically, cross-sectional views taken along the line III-III' of FIG. 2 to describe steps of a method of manufacturing a touch panel according to an embodiment.

Figure 7:
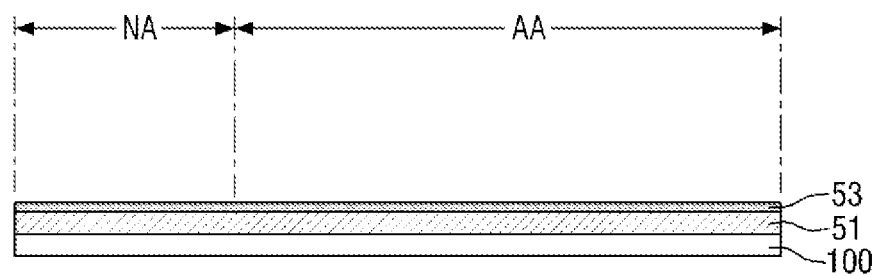
FIGS. 7, 8, 9, 10, 11, 12, 13, 14, 15, 16, and 17 are cross-sectional views illustrating a method of manufacturing a touch panel according to an exemplary embodiment.

Referring to FIGS. 7 through 17, a first conductive layer 51 and a second conductive layer 53 are sequentially stacked on a surface of a substrate 100 having a sensing area AA and a peripheral area NA defined, as illustrated in FIG. 7. The material that forms the first conductive layer 51 is substantially the same as the material that forms the first sensing electrodes 210 and the second sensing electrodes 230 described above with reference to FIGS. 1 through 6. The material that forms the second conductive layer 53 is substantially the same as the material that forms the conductive pattern 233 described above with reference to FIGS. 1 through 6.

Figure 8:
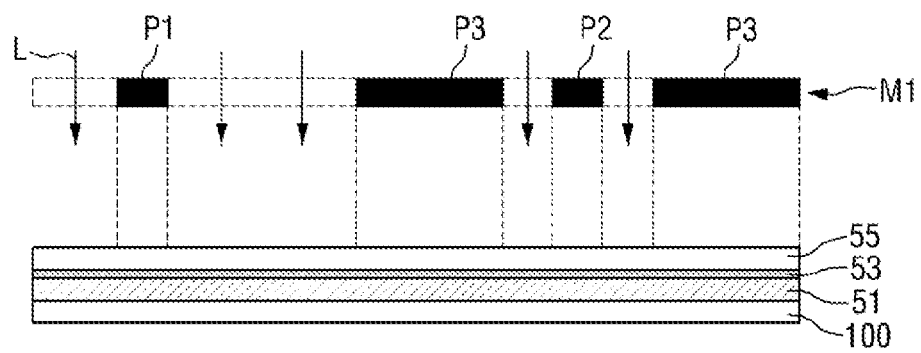

Referring to FIG. 8, a photosensitive layer 55 is formed on the second conductive layer 53. The photosensitive layer 55 may be formed by coating liquid photoresist or may be formed of dry film photoresist (DFR). In addition, the photosensitive layer 55 may be a positive photosensitive layer whose exposed portions can be removed by development. However, the inventive concept is not limited thereto, and the photosensitive layer 55 may also be a negative photosensitive layer whose unexposed portions can be removed by development. For ease of description, a case where the photosensitive layer 55 is of a positive type will be described below as an example.

After the formation of the photosensitive layer 55, a first mask M1 is placed above the surface of the substrate 100. The first mask M1 may include a first light-blocking mask pattern P1 corresponding to an inner wiring pattern 270 (see FIGS. 1 through 6), a second light-blocking mask pattern P2 corresponding to a first connector 220 (see FIGS. 1 through 6), and third light-blocking mask patterns P3 corresponding to first sensing electrodes 210 (see FIGS. 1 through 6) and second sensing electrodes 230 (see FIGS. 1 through 6).

The photosensitive layer 55 is exposed to light L by irradiating the light L toward the substrate 100 from above the substrate 100. In some embodiments, the light L may be ultraviolet light (UV). Of the photosensitive layer 55, portions corresponding to the first light-blocking mask pattern P1, the second light-blocking mask pattern P2 and the third light-blocking mask patterns P3 are not exposed to the light L, and the other portions are exposed to the light L.

Figure 9:
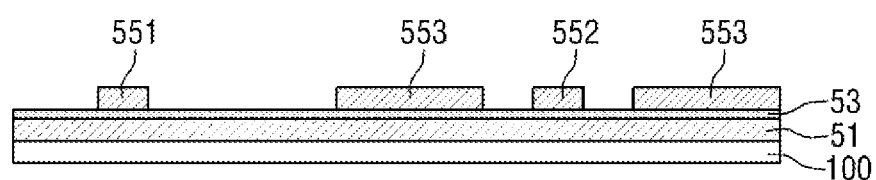

The exposed portions of the photosensitive layer 55 are removed by a development process. As a result, a first portion 551 corresponding to the inner wiring pattern 270 (see FIGS. 1 through 6), a second portion 552 corresponding to the first connector 220 (see FIGS. 1 through 6), and third portions 553 corresponding to the first sensing electrodes 210 (see FIGS. 1 through 6) and the second sensing electrodes 230 (see FIGS. 1 through 6) remain on the second conductive layer 53 as illustrated in FIG. 9.

Figure 10:
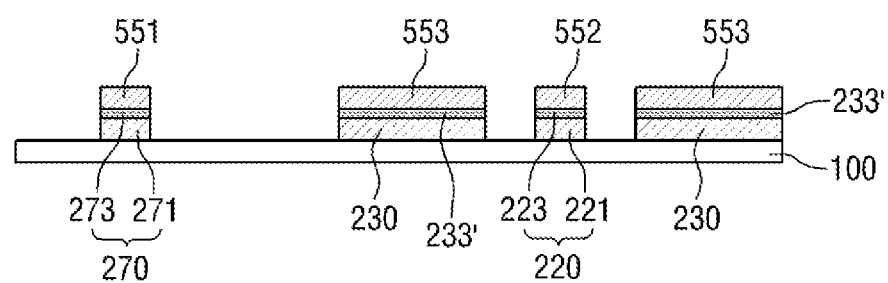

Referring to FIG. 10, the second conductive layer 53 and the first conductive layer 51 are successively etched using the remaining portions (i.e., the first portion 551, the second portion 552 and the third portions 553) of the photosensitive layer 55 as a mask. As a result, the inner wiring pattern 270, the first sensing electrodes 210 (see FIGS. 1 through 6), the first connector 220, the second sensing electrodes 230, and a conductive pattern 233' are formed. The first connector 220 may be structured to include a lower conductive pattern 221 and an upper conductive pattern 223 located on the lower conductive pattern 221. The inner wiring pattern 270 may be structured to include a first wiring pattern 271 and a second wiring pattern 273 located on the first wiring pattern 271. The remaining portions (i.e., the first portion 551, the second portion 552 and the third portions 553) of the photosensitive layer 55 are then removed.

Figure 11:
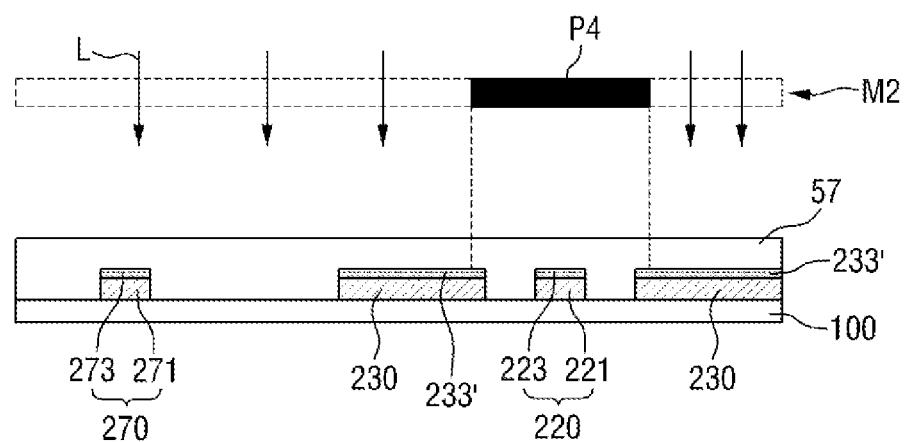

Referring to FIG. 11, a photosensitive insulating layer 57 is formed on the surface of the substrate 100 to cover the inner wiring pattern 270, the first sensing electrodes 210 (see FIGS. 1 through 6), the first connector 220, the second sensing electrodes 230, and the conductive pattern 233'. The photosensitive insulating layer 57 may be an organic insulating material. In some embodiments, the photosensitive insulating layer 57 may be positive photosensitive resin.

Figure 12:
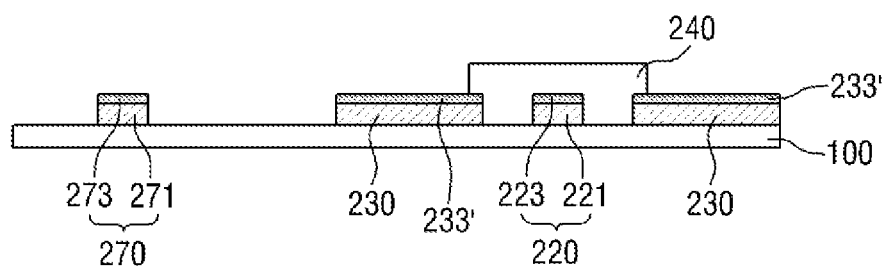

Next, a second mask M2 is placed above the surface of the substrate 100. The second mask M2 may include a fourth light-blocking mask pattern P4 corresponding to an insulating layer pattern 240 (see FIGS. 1 through 6). The photosensitive insulating layer 57 is exposed to light L by irradiating the light L toward the substrate 100 from above the substrate 100. Then, an exposed portion of the photosensitive insulating layer 57 is removed. As a result, the insulating layer pattern 240 (see FIGS. 1 through 6) is formed to cover the first connector 220 as illustrated in FIG. 12. In some embodiments, the insulating layer pattern 240 may extend onto part of each of the second sensing electrodes 230. In this case, since the conductive pattern 233' is formed before the insulating layer pattern 240, part of the conductive pattern 233' may be located between each of the second sensing electrodes 230 and the insulating layer pattern 240.

Figure 13:
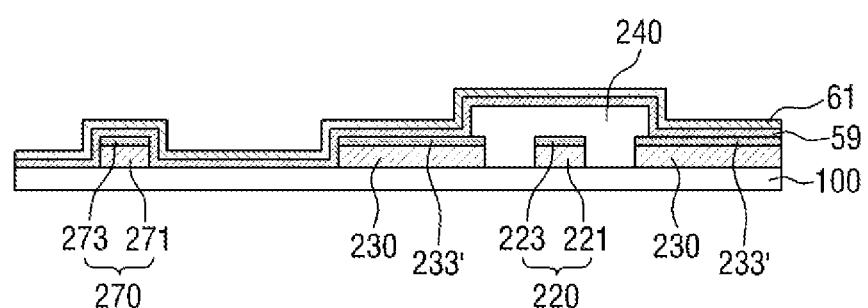

Referring to FIG. 13, a third conductive layer 59 and a fourth conductive layer 61 are sequentially stacked on the surface of the substrate 100 to cover the inner wiring pattern 270, the first sensing electrodes 210 (see FIGS. 1 through 6), the first connector 220, the second sensing electrodes 230, the conductive pattern 233' and the insulating layer pattern 240. The material that forms the third conductive layer 59 is substantially the same as the material that forms the first conductive pattern 251 or the third wiring pattern 281 described above with reference to FIGS. 1 through 6. The material that forms the fourth conductive layer 61 is substantially the same as the material that forms the second conductive pattern 253 or the fourth wiring pattern 283 described above with reference to FIGS. 1 through 6.

Figure 14:
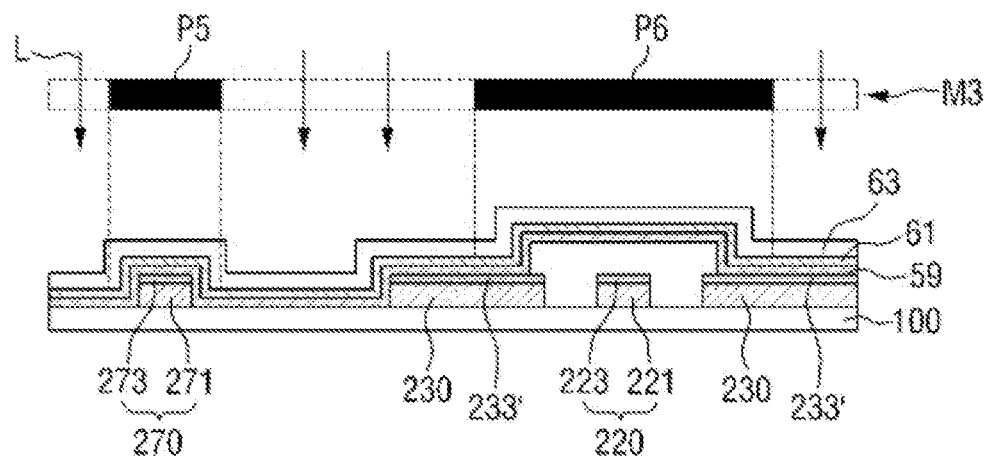
Figure 15:
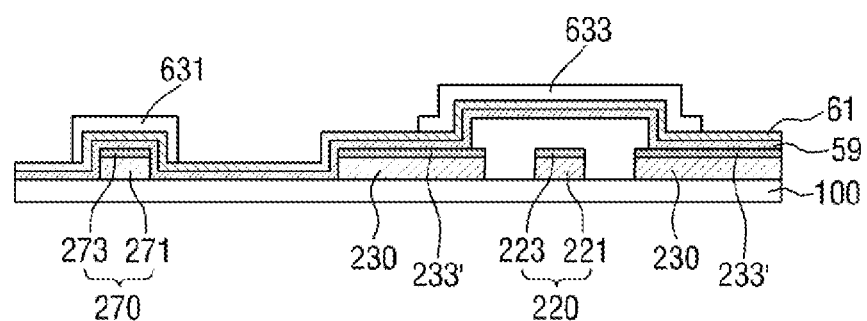

Referring to FIG. 14, a photosensitive layer 63 is formed on the fourth conductive layer 61. The photosensitive layer 63 may be formed by coating liquid photoresist or may be formed of DFR. In addition, the photosensitive layer 63 may be a positive photosensitive layer. However, the inventive concept is not limited thereto, and the photosensitive layer 63 may also be a negative photosensitive layer. For ease of description, a case where the photosensitive layer 63 is of a positive type will be described below as an example.

After the formation of the photosensitive layer 63, a third mask M3 is placed above the surface of the substrate 100.

The third mask M3 may include a fifth light-blocking mask pattern P5 corresponding to an outer wiring pattern 280 (see FIGS. 1 through 6) and a sixth light-blocking mask pattern P6 corresponding to a second connector 250 (see FIGS. 1 through 6).

The photosensitive layer 63 is exposed to light L by irradiating the light L toward the substrate 100 from above the substrate 100. Of the photosensitive layer 63, portions corresponding to the fifth light-blocking mask pattern P5 and the sixth light-blocking mask pattern P6 are not exposed to the light L, and the other portions are exposed to the light L.

The exposed portions of the photosensitive layer 63 are removed by a development process. As a result, a fourth portion 631 corresponding to the outer wiring pattern 280 (see FIGS. 1 through 6) and a fifth portion 633 corresponding to the second connector 250 (see FIGS. 1 through 6) remain on the fourth conductive layer 61.

Figure 16:
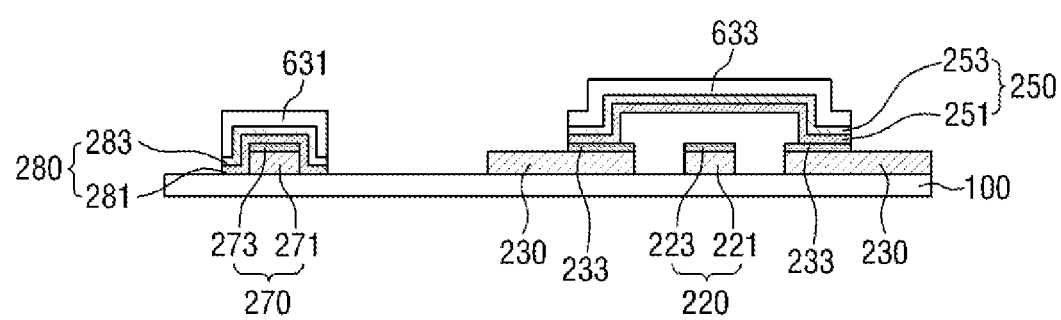

Then, the fourth conductive layer 61, the third conductive layer 59, and the conductive pattern 233' are successively etched using the fourth portion 631 and the fifth portion 633 as a mask. As a result, the outer wiring pattern 280, the second connector 250, and a conductive pattern 233 are formed as illustrated in FIG. 16. The second connector 250 may be structured to include a first conductive pattern 251 and a second conductive pattern 253 located on the first conductive pattern 251. The outer wiring pattern 280 may be structured to include a third wiring pattern 281 and a fourth wiring pattern 283 located on the third wiring pattern 281.

Figure 17:
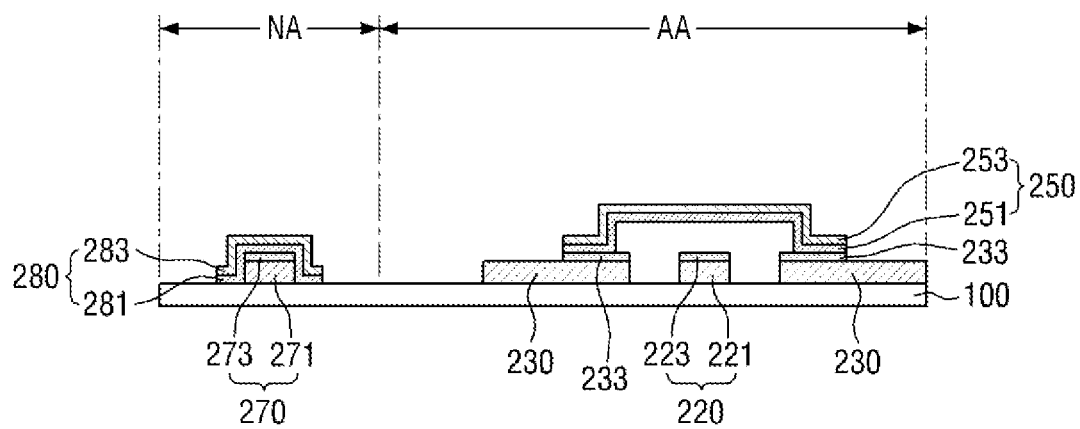

Finally, the fourth portion 631 and the fifth portion 633 are removed, thereby producing a touch panel as illustrated in FIG. 17. The touch panel illustrated in FIG. 17 is the same as the touch panel 10 described above with reference to FIGS. 1 through 6, and thus a detailed description thereof is omitted.

According to the inventive concept described above, wiring lines, first sensing electrodes, second sensing electrodes, a first connector, an insulating layer pattern, and a second connector can be formed using three masks. Therefore, the number of masks used in a manufacturing process can be reduced, thereby simplifying the manufacturing process.

In addition, according to the inventive concept, a conductive pattern is located on each of the first and second sensing electrodes. The conductive pattern can prevent the possible damage to the first sensing electrodes and the second sensing electrodes during the process of manufacturing a touch panel. In particular, the first sensing electrodes and the second sensing electrodes, if made of metal nanowires, are more easily damaged during the manufacturing process. However, according to the inventive concept, the damage to the first sensing electrodes and the second sensing electrodes can be prevented even if the first sensing electrodes and the second sensing electrodes are made of metal nanowires.

Further, according to the inventive concept, the conductive pattern located on each of the first sensing electrodes and the second sensing electrodes can be etched in the process of forming the second connector. Therefore, a mask used to remove the conductive pattern can be omitted.

Embodiments provide at least one of the following features.

According to the inventive concept, a method of manufacturing a touch panel in a more simplified process and a touch panel manufactured using the method can be provided.

However, the effects of the inventive concept are not restricted to the one set forth herein. The above and other effects of the inventive concept will become more apparent to one of daily skill in the art to which the present application pertains by referencing the claims.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation.

What is claimed is:

1. A touch panel comprising:
   a substrate which includes a sensing area and a peripheral area;
   a plurality of first sensing electrodes which are located on a surface of the substrate and arranged along a first direction in the sensing area and a plurality of second sensing electrodes which are arranged along a second direction intersecting the first direction;
   a first connector which is located on the surface of the substrate and connects the first sensing electrodes along the first direction;
   an insulating layer pattern which is located on the first connector;
   a second connector which is located on the insulating layer pattern, intersects the first connector to be insulated from the first connector, and connects the second sensing electrodes along the second direction;
   a plurality of wiring lines which are located on the surface of the substrate, located in the peripheral area, and electrically connected to the first sensing electrodes or the second sensing electrodes; and
   a conductive pattern which is located between each of the second sensing electrodes and the second connector,
   wherein a portion of the conductive pattern is disposed between the insulating layer pattern and each of the second sensing electrodes.

2. The touch panel of claim 1, wherein a portion of the insulating layer pattern is located on each of the second sensing electrodes, and
   wherein an upper surface of the portion of the conductive pattern directly contacts the portion of the insulating layer pattern.

3. The touch panel of claim 1, wherein the conductive pattern is located only in an area in which each of the second sensing electrodes overlaps the second connector.

4. The touch panel of claim 3, wherein a side surface of the second connector is continuous with a side surface of the conductive pattern.

5. The touch panel of claim 1, wherein the second connector comprises:
   a first conductive pattern which is located on each of the second sensing electrodes and the insulating layer pattern; and
   a second conductive pattern which is located on the first conductive pattern,
   wherein the first conductive pattern and the second conductive pattern have the same planar shape.

6. The touch panel of claim 5, wherein the conductive pattern and the second conductive pattern comprise a zinc oxide-based material.

7. The touch panel of claim 6, wherein the zinc oxide-based material comprises at least one of indium zinc oxide (IZO), aluminum (Al)-doped zinc oxide (AZO), and gallium zinc oxide (GZO).

8. The touch panel of claim 6, wherein the first conductive pattern comprises copper (Cu).

9. The touch panel of claim 6, wherein the first sensing electrodes and the second sensing electrodes comprise metal nanowires.

10. The touch panel of claim 5, wherein the conductive pattern and the second conductive pattern comprise the same material.

11. The touch panel of claim 5, wherein the first conductive pattern directly contacts the insulating layer pattern.

12. The touch panel of claim 1, wherein the first connector comprises:
   a lower conductive pattern which is located on the surface of the substrate; and
   an upper conductive pattern which is located on the lower conductive pattern,
   wherein the upper conductive pattern and the conductive pattern are made of the same material.

13. The touch panel of claim 1, wherein each of the wiring lines comprises:
   a first wiring pattern which is located on the substrate;
   a second wiring pattern which is located on the first wiring pattern;
   a third wiring pattern which is located on the substrate and the second wiring pattern and covers the first wiring pattern and the second wiring pattern; and
   a fourth wiring pattern which is located on the third wiring pattern,
   wherein the first wiring pattern is made of the same material as the first sensing electrodes and the second sensing electrodes, and the second wiring pattern is made of the same material as the conductive pattern.

14. The touch panel of claim 13, wherein the first wiring pattern and the second wiring pattern have the same planar shape, and the third wiring pattern and the fourth wiring pattern have the same planar shape.

* * * * *